Patented Apr. 10, 1934

1,954,171

UNITED STATES PATENT OFFICE 1,954,171

FUNGICIDE

Marion C. Goldsworthy, Washington, D. C., dedicated to the free use of the Government and the People of the United States No Drawing. Application September 10, 1932, Serial No. 632,642

1 Claim. (Cl. 167—16)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

My invention relates to the use of copper phosphates in combination with lime, with the formation of basic copper phosphates which may be applied to cultivated and native plants as a liquid spray, when suspended in water in various proportions, or as a dust, when finely ground, or as a paste when the finely-ground basic phosphates are mixed intimately with other parasiticides, insecticides, fillers and carriers.

While I am aware of the common use of basic sulphates of copper, known as Bordeaux mixture, I am aware of the fact that such basic sulphates, while exerting an excellent fungicidal efficiency, nevertheless cause a considerable amount of injury to the sprayed plants and that this sort of injury may, at times, be even greater than that wrought by the plant parasites.

The object of my invention is to supply a material which, while still exerting a superior fungicidal efficiency in the manner of basic sulphate of copper, does not injure the sprayed plants. My invention may be obtained by using the ordinary copper phosphates obtainable on the open market and adding to lime, or by mixing copper oxide with phosphoric acid in such a manner that the copper oxide is completely combined with the phosphoric acid and mixing with lime. It is not necessary to remove excess phosphates contained in the product.

A further object of my invention is to obtain a copper lime mixture to which a suitable insecticide spreader or adhesive may be added without injury to the sprayed, dusted or painted plants.

A still further object of my invention is to obtain a copper lime mixture which, while still toxic to the fungi attacking the sprayed, dusted or painted plants, exerts a stimulating influence upon the growth and the setting and maturity of the fruit of the sprayed plants.

The present invention may largely prevent the injury that usually occurs when Bordeaux (basic copper sulphates) is used; combines readily with insecticides such as the arsenates and nicotine sulphate and may stimulate the growth, setting and maturity of fruit.

By repeated laboratory tests the invention has proven toxic to the spores of fungi which cause peach scab, apple scab, peach brown rot and apple bitter rot. Repeated field tests have proven my invention to maintain a toxicity to the spores of the above fungi for at least a period of two weeks and an inhibitory influence of three to four weeks.

Experiments in the field have proven that my invention controls successfully apple scab, peach scab and peach brown rot.

My invention when compared with applications of Bordeaux mixture (basic sulphates) shows superior qualities of covering and adherence, physical properties very much desired in a fungicide.

The use of my invention in no way complicates the general procedure of spray applications and no unusual or irksome precautions are needed in the preparation of the fungicide. Although I am not restricted in the variation of the proportions of the ingredients, the most common formula to be used as a liquid spray contains the following:

*Example 1.*—Copper phosphate, two pounds; hydrated lime, four pounds; water, fifty gallons. Fill up the spray tank, add the finely ground copper phosphate, and while agitating the suspension, screen and add slowly the hydrated lime, preferably as milk of lime. Basic copper phosphates are formed which have a light blue color, quite similar in color to those of basic copper sulphates. In case an insecticide such as calcium or lead arsenate, a spreader, such as calcium caseinate, glue or an adhesive, such as a colloidal clay, may be required, these are to be added after the other ingredients have reacted.

My invention is also to be used in the form of a dust in the control of parasitic fungi and in the preparation of the material for this purpose, although not restricted to the proportions listed below or to the nature of the carrier, insecticide, spreader or adhesive used, may follow this common formula:

*Example 2.*—One hundred pounds of hydrated lime, ten to twenty pounds of finely ground copper phosphate to which may be added five to twenty pounds of lead arsenate, calcium arsenate or zinc arsenite (insecticide) or one-half to ten pounds of nicotine sulphate (insecticide) or one to twenty pounds of calcium caseinate (spreader) or one to twenty pounds of colloidal clay (adhesive) as may be desired.

My invention may also be used in the protection of cultivated and native plants against parasites by the use of wound paints, and since copper phosphate is quite insoluble, it may be compounded with tars, asphalts, oils, greases, gums, fats, waxes, resins, glycerine, or colloidal clays to form a paste suitable for painting the unprotected part. Inorganic and organic insecticides may be added to these mixtures as may be desired.

In the foregoing examples, while I prefer to employ a finely ground copper phosphate, I am by no means restricted to the use of such a finely ground material and any or all known or theoretical copper phosphates are applicable in this case.

I claim:

A fungicide comprising copper phosphate and lime.

MARION C. GOLDSWORTHY.